United States Patent
Shiue et al.

(10) Patent No.: US 11,018,362 B2
(45) Date of Patent: May 25, 2021

(54) SYSTEM FOR GENERATING ELECTRICITY USING OXYGEN FROM WATER

(71) Applicants: Lih-Ren Shiue, Hsinchu (TW); Zhen-Hua Fei, Suzhou (CN); Pei-Jen Wang, Hisnchu (TW)

(72) Inventors: Lih-Ren Shiue, Hsinchu (TW); Zhen-Hua Fei, Suzhou (CN); Pei-Jen Wang, Hisnchu (TW)

( * ) Notice: Subject to any disclaimer, the term of this patent is extended or adjusted under 35 U.S.C. 154(b) by 244 days.

(21) Appl. No.: 16/427,028

(22) Filed: May 30, 2019

(65) Prior Publication Data

US 2020/0381758 A1    Dec. 3, 2020

(51) Int. Cl.
*H01M 8/0656* (2016.01)
*H01M 4/86* (2006.01)
*H01M 16/00* (2006.01)

(52) U.S. Cl.
CPC ....... *H01M 8/0656* (2013.01); *H01M 4/8652* (2013.01); *H01M 16/003* (2013.01); *H01M 2004/8684* (2013.01); *H01M 2004/8689* (2013.01)

(58) Field of Classification Search
CPC ............. H01M 8/0656; H01M 4/8652; H01M 16/003; H01M 2004/8689; H01M 2004/8684; H01M 10/4207
See application file for complete search history.

(56) References Cited

U.S. PATENT DOCUMENTS

| | | | |
|---|---|---|---|
| 4,652,501 A | 3/1987 | Bennetto et al. | |
| 6,512,667 B2 | 1/2003 | Shiue et al. | |
| 7,544,429 B2 | 6/2009 | Kim et al. | |
| 7,696,729 B2 | 4/2010 | Shiue et al. | |
| 9,174,985 B2 | 11/2015 | Leblanc et al. | |
| 9,450,437 B2 | 9/2016 | Kim et al. | |
| 9,520,608 B2 | 12/2016 | Becker et al. | |
| 9,776,897 B2 | 10/2017 | Silver et al. | |
| 10,164,282 B2 | 12/2018 | Bahrebar et al. | |
| 2014/0072836 A1* | 3/2014 | Mills | H01M 4/94 429/8 |
| 2014/0116877 A1* | 5/2014 | Guillet | C25B 13/00 204/282 |
| 2015/0171455 A1* | 6/2015 | Mills | H01M 8/00 429/422 |
| 2018/0062190 A1* | 3/2018 | Redwine | C25B 1/04 |

* cited by examiner

*Primary Examiner* — Stewart A Fraser

(57) ABSTRACT

Oxygen from water can be efficiently and economically achieved via water electrolysis on antimony, nickel doped tin oxide (Sb,Ni—$SnO_2$/Ti) anode using low DC power. As $O_2$ is evolved, it will be quickly reduced by adjacent cobalt oxide doped carbon nanofilm ($Co_3O_4$—CNF/Ti) to hydrogen peroxide ($H_2O_2$) and electricity. In the said electricity generation, $O_2$ is first formed in $O_2$ evolution reaction (OER), then, electricity is generated in $O_2$ reduction reaction (ORR). Both of anode and cathode are shared by OER and ORR, yet, the former consumes energy and the latter yields electricity. It is the cathode, a load and the anode that form an electricity-forming circuit. The said circuit relies on clean water to supply the fuel, $O_2$, hence, it is designated as all-water fuel cell (AWFC). Supercapacitor is employed as the load for AWFC, and onboard purifiers are providers of clean water for AWFC.

12 Claims, 7 Drawing Sheets

SYSTEM FOR GENERATING ELECTRICITY USING OXYGEN FROM WATER

BACKGROUND OF THE INVENTION

1. Field of the Invention

This invention relates to cogeneration of electricity and sterilized water in an electrochemical cell containing oxygen evolution (OER) anode and oxygen reduction reaction (ORR) cathode. More specifically, the invention relates to a method of attaining $O_2$ by water electrolysis on OER anode, followed by ORR on cathodes to transform $O_2$ into $H_2O_2$ and electricity.

2. Description of the Prior Art

Energy and water are two essential elements to support human lives and human activities. They also occupy the major parts of the expenditure in every household, as well as the major responsibility of every government around the world. With increasing demands of energy and water, lingering global warming and worsening water pollution, the governments have to increase budgets to meet people's needs of energy and water. Facing El Niño, sporadic natural disasters and environmental protection issues, the governments are often out of their hands for money can't solve all situations.

For solving energy needs without polluting the environment, people turn to renewable energy, such as, photovoltaic cells, wind turbines and ocean waves. Nevertheless, the renewable energy is intermittent and geologically limited. Other nature-independent approaches of generating energy include fuel cells, energy harvesting of waste heat and vibration. Among them, fuel cells have existed for more than 160 years, and five types of FCs have been developed. However, none of the development is fully realized as a wide adoption for energy generation. More recently, the 6th type of FC, known as MFC (microbial fuel cell), has attracted people's interest, as seen in many U.S. patents, for example, U.S. Pat. Nos. 4,652,501; 7,544,429; 9,450,437; 9,520,608; 9,776,897 and 10,164,282, just to name a few. The research efforts of all FCs is mainly focused on finding common metals to replace Pt, Pd and Ru, enhancement of power output, membranes and safety. Though the development of MFC has utilized non-noble metals as U.S. Pat. No. '608 claimed, power rate increase using brush electrodes in U.S. Pat. No. '897 and multiple cell compartments in U.S. Pat. No. '282, as well as cells without membrane in U.S. Pat. No. '429, yet, the involvement of microbes and sludge or wastewaters have undermined the commercial viability of MFC.

As far as potable water generation is concerned, the conventional water treatment techniques, including, reverse osmosis (RO), membrane filtration, UV disinfection, Fenton reaction and microbial digestion, are time consuming, expensive accompanied by polluting byproducts. Very recently, Haupt et al have reported a new technique, electrochemical advanced oxidation process (EAOP), in Electrochemistry Communications. Through efficiency and energy consumption analysis for COD (Chemical Oxygen Demands) degradation, EAOP is shown superior over the conventional. The present invention will prove that Sb,Ni—$SnO_2$ catalyst is more effective than boron-doped diamond (BOD) catalyst used by the said journal report.

Besides cost, all FCs have one more serious deficiency, that is, low power density. As a matter of fact, FC commodity is priced based on its power rate, for example, $500-1,000US for 1 KW output. In the publications of MFC work, virtually all of reported power density values are under 1 $W/m^2$. Kodali et al have published an outstanding power density of 452·$W/cm^2$, or 4.52 $W/m^2$, for their MFC in Electrochemica Acta. Obviously, the said power density is still far from the practical level required for many applications including electrical vehicles. Like many other power generators, they all need a power storage device for long-term use of the hard harvested energy. Supercapacitor, also known as ultracapacitor, pseudocapacitor or double layer capacitor, is the best device for saving the energy produced by FC. Supercapacitor is a versatile power amplifier with high charging efficiency, and most importantly, it can be fabricated as the shells for FC and components therein.

SUMMARY OF THE INVENTION

For facile production of $O_2$, as well as for converting $O_2$ to electricity, the present invention provides an autocephalous all-water fuel cell (AWFC) system comprising 4 subsystems for cogenerating electricity and water. The 4 subsystems include (1) energy and water generator, (2) online water purifiers, (3) built-in energy storing arrays and (4) a controller for managing the flow of electricity, water and gas. Except the controller is made by outsourcing, all materials for the other three subsystems are home-made. The 4 subsystems are elaborated as follows:

Energy and Water Generator

The components of the invented AWFC include:

Anode: antimony, nickel-doped tin oxide on titanium plate (Sb,Ni—$SnO_2$/Ti). The anode is made from non-chloride salts of Sn, Sb and Ni prepared according to a validated formulation and protocol to form a clear solution in clean water. The solution is coated on titanium plates, which are dried and sintered in a convection oven to form the desired catalytic film on the substrate.

Cathode: cobalt oxide doped carbon nanofilm on titanium ($Co_3O_4$—CNF/Ti). Similar to the anode, the construction of cathode is also started from a clear solution containing a carbon-rich precursor with an additive and a cobalt salt. Titanium plates are submerged in the solution for impregnating with the precursor-cobalt blend. The coated Ti plates are then subjected to two steps of thermal treatment, charcoalization and carbonization, to reach the desired air cathode. Using the hydrothermal synthesis, modified active carbon (MAC) and supercapacitor electrodes are made below.

Electrode assembly: the anode is sandwiched by 2 cathodes at a fixed spacing. All electrodes have the same dimension and form. Scale up of the assembly is achieved by staking anodes and cathodes alternatively. No membrane is required between the anode and cathode.

Reaction medium: clean water, including tap water and distilled water, is subjected to electrolysis on the anode to form $O_2$ and $O_3$. $O_2$ is directly and quickly reduced on the cathode to form $H_2O_2$. Some $O_3$ mixes with $H_2O_2$ to form peroxone, but, most $O_3$ is exported to an online purifier.

Online Water Purifiers

By means of hydrothermal synthesis, granular activated carbon (GAC) can be coated a conformal layer of carbon nanofilm (CNF) to form a core-shell (c-s) composite. Henceforth, the c-s composite is a modified active carbon (MAC), a potent adsorbent for fast and efficient water-treatment. MAC can be designed as TDS (Total Dissolved Solid) or COD (Chemical Oxygen Demand) remover. Combined 2 or more kinds of removers, it can provide a total solution of water treatment.

Building block: in the c-s composite, GAC is the core, and shell is a thin conductive film synthesized from a carbon-rich precursor. For the sake of easy description, the composite is symbolized by MAC-C wherein C represents the conductive carbon nanofilm. Therefore, not only C can impart GAC conductivity, it also can seal the micropores of GAC to facilitate the regeneration of GAC. MAC-C is the building block for numerous MAC-C's.

Electric field: since MAC-C is more conductive than normal activated carbons, a weak electric field may expedite the adsorption of ions and polar species on the surface of MAC-C or MAC-C's for treatment.

Low power TDS remover: by inserting two stainless steel (SS) plates at both sides of a column packed with MAC-C particles, a flow-through low power TDS remover is formed. Applying 3-5 volt DC across the SS plates, a weak electric field will turn every MAC-C particle into positive or negative electrode depending on its distance from the nearby SS electrodes. As a salty water flow by, the water will be absorbed by particle electrodes via static charge attraction resulting in desalination. As the power is turned off, most of the adsorbates will leave automatically, and the residual adsorbates can be flushed out with 10% volume of clean water purified online.

Low power COD remover: this is similar to field effected TDS column, except the packing material is MAC-CX, wherein X is oxides of the first row transition metals made by hydrothermal synthesis on MAC-C as carrier. In addition to voltage, $O_3$ gas) is also injected from AWFC to COD column for converting the gas to hydroxy radical (.OH), which can perform quantitative and fast ablation of COD in flow through mode. Since COD pollutants can be completely destructed, the regeneration of MAC-CX can be more easily than the regeneration of MAC-C.

Built-in Energy Storing Arrays

Except energy density & leakage current, supercapacitor is a better device for energy storage than all batteries in terms of cost, life & performances. Moreover, the supercapacitor can serve as power amplifier, voltage-balancing manager and battery booster. The present invention will deliver a unique supercapacitor with the following unconventional features:

Electrodes: electrodes are grown directly in monolithic carbon nanofilm (CNF) doped with capacity-enhancing elements on stainless steel (SS) foil by way of the hydrothermal synthesis. In the fabrication process, pyrolysis under 600-900° C. is applied to the transformation of a carbon rich precursor to CNF or graphene film. The electrodes as made contain only carbon and metal oxides or chalcogenides. There is no binder in the electrodes that strongly adhere to SS substrate. The performance of electrodes is characterized by capacitance density, $F/cm^2$.

Gel polymer electrolyte (GPE): a polymer is selected for dissolving in aprotic solvents blend, which have a working temperature range from −60° C. to over 150° C., with at least an electrolyte to form the GPE. Such GPE has 3 functions for the supercapacitor thereby prepared: (1) as separator, (2) as ionic conductor and (3) as adhesive to glue the stacked electrodes in position. GPE is mainly assessed by its potential stability, which is measured by cyclic voltammetry (CV). Test samples show good cyclability in a potential range of −3V↔3V. This means that the cell voltage of the supercapacitor in this patent is 3V.

Electrodes assembly: based on the electrode's capacitance density, $F/cm^2$, and product's targeted working capacitance, the required area of electrode is determined. Electrodes are made into pieces of desired dimensions. Each piece of electrode is applied a layer of GPE, then, 2 electrodes are stacked with GPE-coated sides facing each other in an automatic stacker. The top electrode of stack is applied a layer of GPE, which is stacked by another pre-coated electrode. The vertical coating-stacking process is repeated until the targeted working voltage is attained [Needed number of electrodes in stack=(working voltage/3V)+1]. Only the end electrodes of stack are equipped with electrical leads for connecting to a charging source or load, all of the middle electrodes are bipolar electrodes. When the capacitor is charged, one side of a bipolar electrode will carry positive charge, and the other side negative. Due to the electrode carries different polarities at 2 sides, thus, it is named bipolar electrode.

Built-in supercapacitors: by juxtaposed stacking, 2 one-side coated electrodes on SS plates can be fabricated into a shell or housing for AWFC. The said invisible supercapacitors can also serve as frames, chassis, and other supports for the interior structure of AWFC. If the size of AWFC is big, its supercapacitor shell can be turned into a container for a bank of multiple smaller capacitors in an array of power tank as described in U.S. Pat. No. 7,696,729. Actually, every supercapacitor built in the AWFC can be integrated in the tank. Each supercapacitor member has no fixed physical connection. However, they can be assembled in real-time to form series or parallel linkage through electronic switches and bus bars under the command of a central process unit (CPU).

Central Process Unit (CPU) Controller

The AWFC of this invention can be operated continuously, silently and safely to generate electricity every second and every day. Thus, every supercapacitor member of the power tank can be charged fully prior to the occurrence of power need. A controller, such as CPU, serves as the brain, whereas AWFC is the heart of an affordable energy and water generator. The required functions of CPU and two unique platforms of operation for the best use of energy saved are described below:

CPU and power tank: besides managing energy flow, the CPU also governs the gas ($O_3$) flow, which is needed on abating COD, as well as $H_2O$ flow between AWFC and onboard water purifiers. The CPU should possess the functions: memorizing supercapacitors' location, monitoring the energy state of supercapacitors, identifying failed capacitor, charging the supercapacitor individually or collectively, calculating number of supercapacitors needed for power delivery, serially linking supercapacitors, wherever they are, for power delivery, calculating number of supercapacitor needed for harvesting energy, parallel linking supercapacitors for energy harvesting, conducting charging-discharging swing (CD Swing) between two identical groups of supercapacitors, reversely charging supercapacitors for saving energy, reversing the polarities of supercapacitors for charging or discharging, delivering $O_3$ to enhance COD ablation, delivering clean water to AWFC, actuating OER, closing OER, etc.

CD Swing platform: due to low energy density, supercapacitor can be easily exhausted at discharging. Hence, power provision of supercapacitor is intermittent for the capacitor needs to be fully recharged before it can give power again. Furthermore, the voltage of capacitor falls quickly and soon becomes ineffective as the voltage of capacitor is lower than the driving voltage of load. For saving energy, supercapacitor should use only the energy stored under the first ⅓ rated voltage. Using 2 identical groups of supercapacitors, each group is allowed to release only the first ⅓ rated voltage. When the $1^{st}$ group has discharged, it will go into charging mode, and the 2$^{nd}$ group immediately assumes the discharging role. In the next cycle, the charging and discharging sequence is reversed. The two groups perform the reciprocal charging and discharging until the demand of power is fulfilled. Since only the effective energy is released and refilled, the energy-utilization efficiency of CD Swing is high. Moreover, the capacitors can provide power continuously, which is not seen in conventional capacitors. The said CPU can dictate the operation of CD Swing, and it can also set the level of output power by adjusting the switching frequency.

Reverse charging platform: in the discharge of supercapacitors that contain at least one bipolar electrode, it is observed by the inventors that as one side of bipolar electrodes are engaging discharging, concurrently, the reverse sides are being charged. The reverse charging is caused by the passage of return current passing through the supercapacitor. Eventually, the reverse side of bipolar electrodes will develop a higher absolute value of voltage (−V) than that (+V) of the other side. On reversing the polarity of supercapacitor's leads by the said CPU, the virtually deceased device will become active again. Reverse charging belongs to one kind of energy harvesting, which is similar to regenerative braking of vehicles in terms of retrievable energy therein.

BRIEF DESCRIPTION OF THE APPENDED DRAWINGS

The present invention is best understood by reference to the embodiments described in the subsequent sections accompanied with the following drawings.

DETAILED DESCRIPTION OF THE INVENTION

Figure 1:
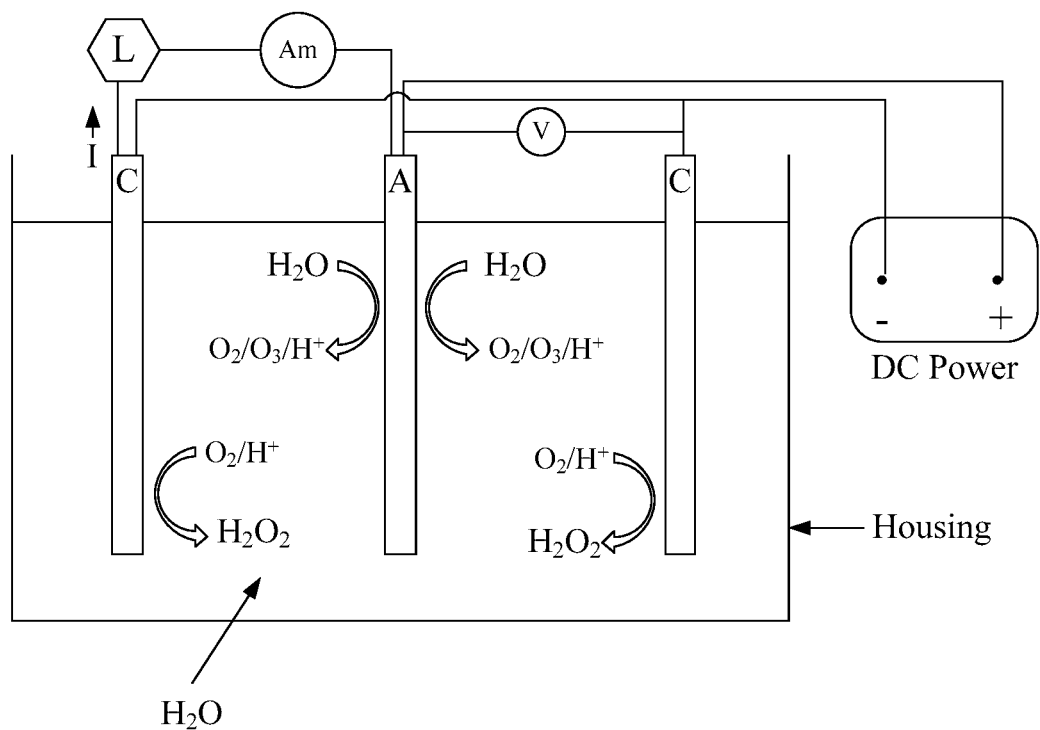
FIG. 1 is a schematic diagram of a basic unit of AWFC composed by 1 anode sandwiched by 2 cathodes at a fixed gap. Two electric circuits are included FIG. 1, one supplies power for OER on anode, the other is ORR by cathodes with produced electricity drawn by a load and measured by ammeter.

A detailed description of the hereinafter described embodiments of the disclosed apparatus and method are presented herein by way of exemplification with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

The invention presents an autocephalous AWFC system containing four subsystems: (1) AWFC, for generating electricity and sterilized H$_2$O constantly, (2) online water purifier composed of TDS and COD removers for supplying clean water to AWFC, (3) supercapacitors as housing and interior supports for storing energy produced by AWFC, and (4) CPU manages the utilization of energy and the flow of electricity, O$_3$ gas) and H$_2$O to meet the demands. The said system is easy to scale up for various power applications and water need at households, communities, businesses, industries, military and remote areas. The fuel, O$_2$, is attained from H$_2$O in fluid form as liquid or vapor by electrolysis on anode using low-cost catalyst and low power. As a source of fuel, water is safe, available ubiquitously and cheap, yet the products of AWFC system are precious resources. Thus, the AWFC system has high cost-performance value (CP value), and it is affordable to all levels of consumers at any location. The four subsystems are elaborated sequentially in the following paragraphs.

All-Water Fuel Cell (AWFC)

It is all started from a decade long development of electrolytic ozone (EO$_3$) by the inventors. Water electrolysis always yields O$_2$ on anode, H$_2$ at cathode, as described by the following Equations 1 & 2, respectively:

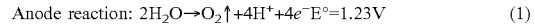

$$\text{Anode reaction: } 2H_2O \rightarrow O_2\uparrow + 4H^+ + 4e^- \quad E°=1.23V \qquad (1)$$

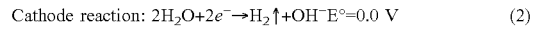

$$\text{Cathode reaction: } 2H_2O + 2e^- \rightarrow H_2\uparrow + OH^- \quad E°=0.0 \text{ V} \qquad (2)$$

Where E° is the standard potential required for producing the gases, O$_2$ & H$_2$. If ozone (O$_3$) is desired, it needs to raise the O$_2$ evolution potential (OEP) at least to the level where O$_3$ is formed as described by Equation (3):

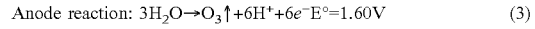

$$\text{Anode reaction: } 3H_2O \rightarrow O_3\uparrow + 6H^+ + 6e^- \quad E°=1.60V \qquad (3)$$

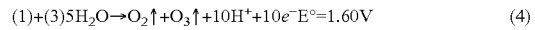

$$(1)+(3) 5H_2O \rightarrow O_2\uparrow + O_3\uparrow + 10H^+ + 10e^- \quad E°=1.60V \qquad (4)$$

Therefore, an effective, economical and anodically stable O$_3$-forming catalyst must be available for the anode. We have tried several precious metals, such as, platinum (Pt), gold (Au) and iridium (Ir), as well as glassy carbon and graphite. Eventually, we proved that a dimensional stable anode (DSA)-tin oxide (SnO$_2$) doped with antimony (Sb) and nickel (Ni) meets the requirement.

SnO$_2$ is an intrinsic n-type semiconductor, doping with Sb makes SnO$_2$ transparent and electric conductive (the Sb-doped SnO$_2$ is called ATO). As the second dopant, Ni is responsible on elevating OEP. In the harsh oxidation environment of EO$_3$ anode, titanium (Ti) is the most reasonable metal as the substrate for Sb/Ni doped SnO$_2$. Sb,Ni—SnO$_2$/

Ti is a widely discussed anode of $EO_3$ in the literature, yet, we have chosen non-chlorine salts for Sn, Sb and Ni [for avoiding the evolution of HCl vapor during thermal preparation of Sb,Ni—$SnO_2$] to make the catalytic film, which is distinctive from the literature reports. Table 1 lists the non-Cl precursors that can be selected for 3 metallic elements for Sb,Ni—$SnO_2$/Ti fabrication, respectively:

TABLE 1

Precursors of Sn, Sb, and Ni for making Sb, Ni—$SnO_2$

| Elements | Precursors | Preferred |
| --- | --- | --- |
| Sn | Stannous carbonylates | Stannous oxalate |
|  | Stannous dicarboxylates | ($SnC_2O_4$) |
| Sb | Antimonyoxides, Sb tartrates | Antimony trioxide |
| Ni | Nickel carboxylates | Nickel acetate |
|  | Nickel dicarboxylates |  |

Sb, Ni—$SnO_2$ catalytic film is made via multiple cycles of "coating-drying-sintering" under air. The coating solution is water containing a mixture of stannous oxalate, antimony trioxide and nickel acetate by mole ratio of three metals at Sn:Sb:Ni=500:8:1. If the $Sn^{4+}$ concentration or [$Sn^{4+}$] is set at 0.2M and $Sb^{3+}$—$Ni^{2+}$ are added by the said ratio, the solution may yield 16-17 nm thickness of catalyst film on Ti surface per cycle. We believe that the ideal film thickness range should be 2-4 μm. It will take the 0.2M solution 118 to 236 cycles of process to reach the desired film thickness. For expediting the slow buildup of film, the present invention proposes the coating solution to be: [$Sn^{4+}$] at 0.8~4.2 M, [$Sb^{3+}$] at 2.8~4.4% of [$Sn^{4+}$] and [$Ni^{2+}$] at 0.8~1.8% of [$Sn^{4+}$]. It is measured that the concentrated coating solution can deliver 60-65 nm of film per cycle.

Coupling a Sb,Ni—$SnO_2$/Ti anode with a SAE (Society of Automotive Engineer) 304 stainless steel cathode, the pair of electrodes can electrolyze tap, other purified plain water or water vapor to generate $O_2$ and $O_3$ on anode and $H_2$ on cathode using as low as 3 volts DC. If higher volts are applied, more gaseous products will be formed. Regardless of applied voltages, the yield ratio of $H_2$:$O_2$:$O_3$ is 6:2:1. The current efficiency of $O_3$ formation is calculated at 30-35% without PEM (proton exchange membrane) and any additive added to water. Thus, the $EO_3$ electrolyzer of the present invention can produce $O_2$/$O_3$ at high efficiency but low power consumption. Nevertheless, the reaction at the SS cathode incurs two issues for $EO_3$:
1) Fouling—Water borne $Ca^{2+}$/$Mg^{2+}$ form scale adhered strongly on the cathode resulting in passivation. Regeneration of cathode is a nuisance.
2) $H_2$— Fast generation of $H_2$ at cathode posts a safety issue, a real concern.

In order to solve the said issues, an air cathode, electrode that can react with $O_2$ from air, is developed by the present invention. Instead of SS, Ti is used as substrate for constructing the cathode for the sake of corrosion free. FIG. 1 shows an enlarged assembly by a Sb,Ni—$SnO_2$/Ti anode sandwiched by 2 cathodes fixed at a constant spacing, such as, 1-2 mm, without separator or membrane disposed between any pair of electrodes. With 3 electrodes in a stack, which actually contains 2 cells connected in series. As shown in FIG. 1, there are two side-by-side circuits in the electrolyzer: one is electrolysis of water on the anode induced by a DC power supply, wherein the working voltage can be measured by a voltmeter in parallel with anode and cathode. The other circuit is reduction of $O_2$ composing of cathode, load, ammeter and Sb,Ni—$SnO_2$/Ti anode. $O_2$ evolution reaction (OER) is actuated on anode by the DC power as described by Equation (4):

$$5H_2O \rightarrow O_2\uparrow + O_3\uparrow + 10H^+ + 10e^- \quad E°=1.60V \quad (4)$$

Equation (4) is same as the anode reaction of the aforesaid $EO_3$ electrolyzer. Except $O_3$, the other three products of Equation (4) are transformed by the catalyst of cathode to $H_2O_2$ as Equation (5) describes:

$$O_2 + 2H^+ + 2e^- \rightarrow H_2O_2 \quad (5)$$

Equation (5) is two-electron pathway of oxygen reduction reaction (ORR), wherein water is not involved, consequently, no $H_2$ or $OH^-$ will be formed. The anion ($OH^-$) is believed the cause of Ca/Mg scaling on SS cathode. The issues of $H_2$ formation and fouling are solved or minimized. As soon as the OER is kicked off, $O_2$, $H^+$ and electron will be generated, and they will instantly and automatically flow form anode to cathode, which induce ORR correspondingly. Electricity generated by ORR can be easily withdrawn by a load of resistor or hungry supercapacitor, and the magnitude of current can be measured by an online ammeter. It is the visible generation of electricity that bestows the circuit including air cathode, load and Sb,Ni—$SnO_2$/Ti anode an all water energy-producing fuel cell, or AWFC. While $O_2$ is reduced on cathodes, $O_3$ will combine with $H_2O_2$ to form peroxone, which is a new AOP (advanced oxidation process) reagent capable of sterilizing drinking $H_2O$, groundwater, wastewater and polluted soils. Peroxone can also disintegrate volatile organic compounds, chlorinated solvents, munitions diesel, and PAH's (polynuclear aromatic hydrocarbons).

The unique and innovative features of the said AWFC are:
1. All reactions occur in plain water, a closed and pure environment.
2. $O_2$ is formed from $H_2O$ internally and it diffuses automatically to the ORR site. There is no need of diffusion setup to direct $O_2$ reduction, such as, gas diffusion layer (GDL), at cathode.
3. $H^+$ also diffuses freely by itself making PEM (proton exchange membrane) unnecessary.
4. ORR induces OER and vice versa. The reciprocal reactions exist even without a DC power source for OER for a period. Without the DC power, generation of electricity by the FWFC will fade but never disappear.
5. With a low power constantly provided to OER to make ample $O_2$, ORR will continuously produce significant power.
6. More ORR sites and confinement of $O_2$ for reaction are the keys to produce high power and large current from AWFC rather than the increase of power rate of DC energy source that supports OER.
7. Energy and sterilized water, 2 essential and valuable resources, are co-generated.
8. $O_2$ is the fuel for current generation in AWFC, which is obtainable from water in fluid form as liquid or vapor. $O_2$ can also come from air.

Figure 2:
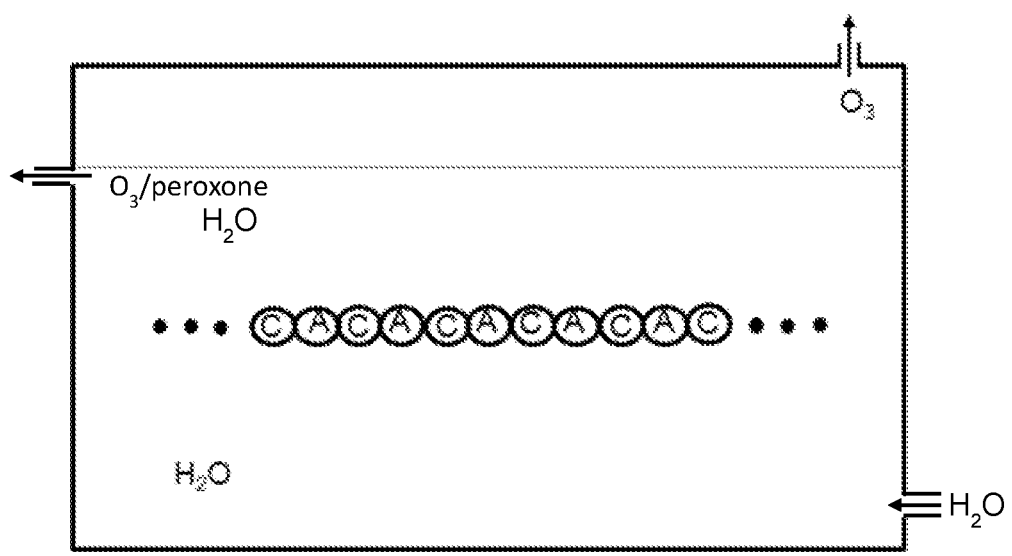
FIG. 2 is a schematic diagram of a stack of multiple anodes and cathodes. An anode and a cathode constitute a cell, thus, there are 10 cells are formed in the diagram.

FIG. 2 shows the scale up of AWFC by stacking multiple anodes and cathodes in a fixed gap of open assembly. Both electrodes employ different catalysts, but they all have perforated holes for easy evolution of $O_2$, as well as for even distribution of $O_2$ all over the cathode surface. A cell is formed by one side of anode facing one side of cathode, thus, ten cells are included in the drawing of FIG. 2. All anodes can be arranged in series to enlarge voltage, or in parallel to attain higher current output. Similarly, all cathodes can do the same arrangement. Both anode and cathode can be fabricated in the form of straight plates, bended plates, plates of designed figures, tubes and meshes. In other words, the invention can deliver the electrodes in any shape as demanded.

Figure 3:
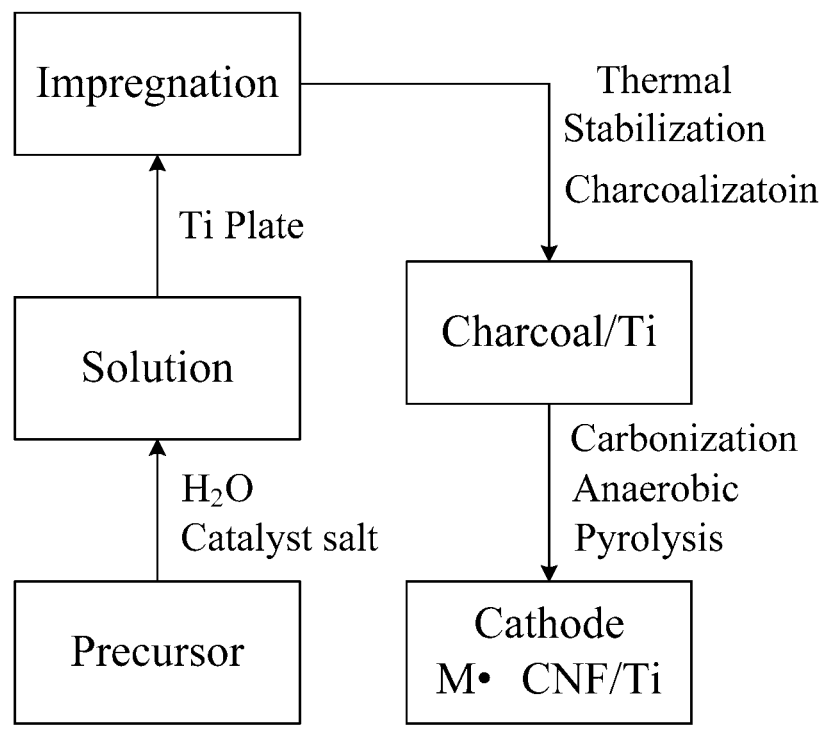
FIG. 3 is a flow chart of hydrothermal synthesis for fabricating air cathodes using Ti plate as carrier. If granular activated carbon and stainless steel foil are used as carriers in conjunction with their solutions, the products would be modified active carbon (MAC) and binder-free electrodes for supercapacitor, respectively.

FIG. 3 is a flow-chart protocol, known as hydrothermal synthesis, for fabricating air cathodes. The process is begun with the preparation of aqueous solution of a carbon-rich precursor. Also, all needed catalysts in metal salts are dissolved to make one pot of solution. Then, Ti plate is submerged in the solution for a period time for impregnating with precursor and catalyst on Ti surface. After drainage of excess solution, coated Ti is subjected to 200-400° C. charcoalization under air for forming doped charcoal. The treatment is also a thermal stabilization of the precursor. Finally, the charcoal is carbonized via pyrolysis under 600-900° C. and oxygen free environment. A conformal and monolithic layer of catalyst (M) doped carbon nanofilm will be directly grown on the Ti substrate (M.CNF/Ti), which is an instant air cathode ready for AWFC operation.

As a carbon-rich precursor, the selection may include polyacrylonitrile (PAN), polyvinyl pyrrolidone (PVP), polyvinyl alcohol (PVA), polyacrylic acid (PAA), polymethyl methacrylate (PMMA), celluloses, dextrin, lignin, lingo salt, polysaccharides, gelatin and polyimide. As the catalyst for ORR on cathodes, this invention choses cobalt oxide ($Co_3O_4$). Selection of cobalt precursor may include cobalt nitrate, cobalt sulfate, cobalt carbonate, cobalt hydroxide, cobalt bromide and cobalt chloride. By replacing Ti with granular activated carbon (GAC) or SAE 304 stainless steel (SS) foil in conjunction with the specific solution of carbon-rich precursor and additives, the hydrothermal synthesis of FIG. 3 can be adopted to produce modified activated carbon (MAC) for online purifications of water, or supercapacitors for storing energy generated by the AWFC.

Onboard Water Purification

Water is ubiquitous on earth, even in the most arid areas, water can be found in underground. But, water from underground, ditch, river, lake, creek and ocean is often not useable for anything. TDS and COD (BOD included) are two most pollution to be eradicated from water. The invention has developed application-specific adsorbents using GAC as carrier or support. GAC is widely in water treatment for adsorption of ions/dyes/organics/volatile organic vapor (VOC), filtration and support of catalyst. However, GAC has poor conductivity and micropores, the latter makes a saturated GAC hard to regenerate. For solving the said problems particularly regeneration, the invention has applied hydrothermal synthesis of FIG. 3 to GAC. A monolithic layer of conductive carbon nanofilm (CNF) is coated all over every GAC particle resulting in a new core-shell composite, The new particle is designated as MAC-C, wherein MAC is the core, modified GAC, and shell C is CNF that not only imparts MAC high conductivity but seals the micropores. From test, MAC-C is proved a potent TDS remover for raw waters with TDS more than 100K ppm. MAC-C is also a building block for creating COD-oriented adsorbents, MAC-CX. X is a collective symbol for catalytic oxides of the $1^{st}$ row of transition metals on the periodic table. MAC-CX is fabricated by adding specific X, which is dictated by the property of wastewater, onto MAC-C followed by thermal treatment. Using the right combination of transition metals, MAC-CX can abate more than 10K ppm of COD per one pass of wastewater through the adsorbent. Both MAC-C and MACX are prepared using heat from 300° C. and above. Therefore, MAC-C and MAC-CX are robust that they can stand the flushing impact of wastewater 24-hour a day for months.

Taking the advantage of high conductivity of MAC, 2 SS electrodes can be disposed at the two sides of the packing towers of MAC-C and MAC-CX. A low DC volt, 3-5 V, is applied across the electrodes to create a weak electric field in the towers. MAC-C & MAC-CX in the field will be induced into positive particle electrodes on particles near the anode, as well as negative particle electrodes by particles close to the cathode. For MAC-C, adsorption of ions from brine or seawater on the charged particles is facilitated by the static charge attraction creating a novel low-power adsorptive desalination. On the other hand, COD-adsorbent, MAC-CX, can catalyze $O_3$ gas) supplied by AWFC into hydroxy radical (.OH). . OH is a stronger oxidant than $O_3$ (as listed in Table 2) and its decomposing rate of COD pollutants is hundreds times of that of $O_3$.

TABLE 2

Oxidation Potential for Some Oxidants

| Oxidants | Oxidation Potential (V) |
| --- | --- |
| Fluorine ($F_2$) | 3.06 |
| Hydroxyl radical (•OH) | 2.80 |
| Oxygen (atomic) | 2.42 |
| Ozone ($O_3$) | 2.08 |
| Hydrogen peroxide ($H_2O_2$) | 1.78 |
| Hypochlorite ($OCl^-$) | 1.49 |
| Chlorine ($Cl_2$) | 1.36 |
| Chlorine dioxide ($ClO_2$) | 1.27 |
| Oxygen ($O_2$) | 1.23 |

With the assistance of weak electric field, charged or polar COD pollutants are attracted to the particle electrodes of MAC-CX, which allows . OH, formed on the surface of MAC-CX as well, to perform precision kill quickly and nearly completely. The aforesaid COD destruction by means of . OH is another new technique for water treatment, and it is named as low power AOP. When the field-actuating power is turned off, the ions on MAC-C and residues adsorbed on MAC-CX via static charge attraction will automatically leave. Therefore, a fast regeneration of the adsorbents can be attained by flushing the packing bed with as little as 10% volume of the in-situ produced clean water.

Supercapacitors

On constant supply of $O_2$ by OER at Sb,Ni—$SnO_2$ anode, the FWFC will generate electricity every second and every day. This invention utilizes a lot of supercapacitors to store the energy produced continuously. As long as the voltage of AWFC is higher than that of supercapacitor, the latter will always completely accept any magnitude of charging current. When the capacitor is full, the power generation of AWFC should not be stopped as it does no harm to any component of the system. Using hydrothermal synthesis of FIG. 3 and stainless steel (SS) foils or SS plates as substrate, an adhered conformal layer of monolithic carbon nanofilm (CNF), at a thickness of 50-70 µm, can be in-situ grown on the substrates. As described in the protocol of FIG. 3, the conductive CNF is derived from a carbon-rich precursor with additives added to enhance the energy density of supercapacitors made thereby. Thus, the electrodes from 600-900° C. pyrolysis are instant electrodes, accompanied with a gel polymeric electrolyte (GPE), for fabricating the desired supercapacitors. The electrodes born under high temperature have yet been reported in literature. They have the following unique features:

1. No organic binder is used, only conductive nano carbon matrix and dopants in the electrodes made by thermal processes.

2. Porosity and hierarchical structure can be tailor made.
3. Metal oxides and dichalcogenides, which can impart pseudocapacitance, can be designed in as dopants for CNF.
4. Transformation of precursor to activated carbon, graphite or graphene is attainable by controlling the species of precursor, catalyst, pyrolysis temperature, atmosphere and heating time.
5. Foils of stainless steel (SS), titanium (Ti) or Ti clad copper (Cu) can be used as current collector.
6. Foil thickness is at 10-20 µm, which is beneficial to the specific energy and power densities of supercapacitors fabricated thereby.
7. Both SS and Ti are stronger corrosion resistant than the conventional Al or Cu, thus, the former can deliver longer lifetime to supercapacitors made thereby.
8. Adhesion between carbon layer and current collector is built by chemical bonding, which is also beneficial to the liability of supercapacitors.

GPE is another unique character of the supercapacitors by this invention. It is a printable gel made of a polymer dissolved in aprotic solvents with one or more salts as solute. Table 3 lists the materials that can be selected for the polymer, solvent and solute, respectively.

TABLE 3

Materials Selection for GPE

| # | Components | Materials |
|---|---|---|
| 1 | polymer | Polyvinyl alcohol (PVA), polyacrylonitrile (PAN), polyvinyl pyrrolidone (PVP), gelatin, alginate, chitosan |
| 2 | Aprotic Solvent | Alcohols, acetone, dimethyl sulfoxide (DMSO), N,N-dimethyl formammide (DMF), N-methyl 2-pyrrolidone (NMP), acetonitrile, propylene carbonate (PC), ethylene carbonate (EC) |
| 3 | Solute | Perchlorates/sulfates/hexafluoro phosphates of alkali metals (Li, Na, K) |

GPE decides the electrochemical performance and lifetime of supercapacitor. Each component of GPE has its designed purpose in the device. Polymer is the backbone related to the ESR (equivalent series resistance) of capacitor. Solvent will determine the working temperature, targeted at the range −60° C.-150° C., and electrochemical potential stability of capacitor. Lastly, solute provides ions for building capacitance and ionic conduction to complete the electric circuit. Collectively, GPE presents three functions for supercapacitors:
a. In-situ separator to prevent electric short
b. Ionic conductor to lower ESR, and
c. Adhesive to secure electrodes in position The unit cell of a supercapacitor comprises 2 electrodes with GPE in between as depicted by FIGS. 4a and b. While FIG. 4a shows 2 bended electrodes, FIG. 4b has 2 round electrodes, or the roll could be formed by 2 pipes or 2 GPE-printed electrode strips wound concentrically. Electrodes of 4a and 4b are symmetric, and they are indistinguishable before charging. After charging, one electrode will carry positive charge and the other negative. But, the polarity of the electrodes can be switched as wish, and they can be shorted without damage to each other. A unit cell like 4a and 4b has a working voltage of 3V, known as cell voltage. Though the cell voltage is 3 V, a single-cell supercapacitor can perform in a range from −3V to 3V, or the potential window is 6V. Most power applications of supercapacitors require potential windows larger than 6V. Instead of serially linking multiple singular supercapacitors, this invention develops a technique of vertical juxtaposition of multiple electrodes into a high-voltage module as seen in FIG. 5a. In FIG. 5a, there are 10 pieces of rectangle electrodes, 2 end electrodes and 8 middle electrodes, in a sack between two end insulating plates. The middle 8 electrodes are bipolar electrodes denoted with a dot. Only the end electrodes are equipped leads for connecting to a charging source or loads. As the end electrodes are charged, the 2 sides of each bipolar electrode will be induced different polarities.

The stacking process of FIG. 5a is begun with the deposition of the bottom end plate on an automatic stacker. Next, the bottom end electrode is placed atop the end plate, followed by coating a uniform layer of GPE in pre-fixed amount on the upside of the end electrode. And next, the $1^{st}$ bipolar electrode is landed on the end electrode with a coating of same quantity of GPE for contacting another layer of GPE on the electrode below. After pressing the 2 electrodes in stack to mix GPE therein, the upside of the $1^{st}$ bipolar electrode is applied GPE, followed by the sequential stacking of $2^{nd}$, $3^{rd}$, $4^{th}$, . . . $8^{th}$ bipolar electrodes until the top end electrodes and top insulating end plate are stacked. Application of GPE on an electrode is always before stacking. It is important to follow 3 rules of stacking as below:
A. Application of GPE is executed by machine to ensure right amount.
B. Stacking must be under vacuum, so that air trapped between every two electrodes can be evacuated.
C. Stacking must be under a weight, e.g., 10 kg, so that GPE can be pressed to form a solid and uniform interlayer.

After application of GPE, the gel will remain tacky until it is in contact with layer of GPE, then, a porous structure will be formed, which serves separator, on losing some of its solvent to adsorption by the electrodes. The said separator also secures the stacked electrodes in position. For the sake of insulation, the excessive GPE squeezed out of stack edges should be removed. Then, the edges are sealed to protect the element therein.

Figure 5A:
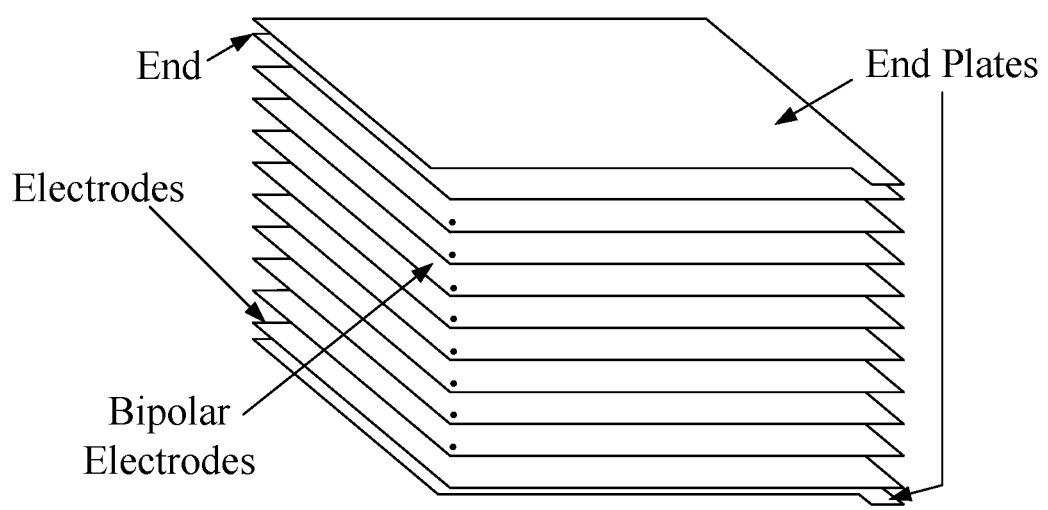
FIG. 5a is a diagram of assembling supercapacitor electrodes by vertical juxtaposition into an element. The stacked electrodes are secured by a GPE.
Figure 5B:
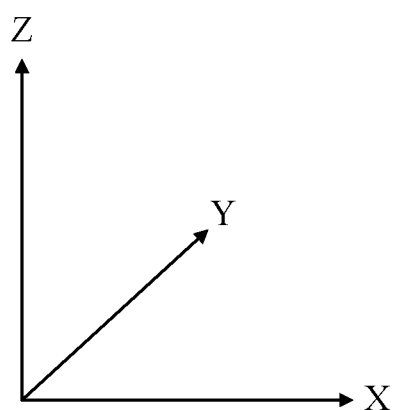
FIG. 5b shows that XY product determines the overall capacitance of supercapacitor, the height of Z axis sets the working voltage of supercapacitor.

FIG. 5a illustrates the assembly of a 3D element through an in-house series linkage of multiple electrodes into a high-volt supercapacitor module. On the other hand, FIG. 5b shows the correlation of module's capacitance and voltage with stacking using a 3-axes coordinate. In FIG. 5b, the XY product represents the effective area of an electrode in stack. A cell is formed by 2 electrodes, and multiplying the electrode area by the capacitance density ($F/cm^2$) of electrode yields the capacitance of a cell. Nevertheless, the overall capacitance of a module is smaller than that of a cell in the module. Equation (6) can be used to calculate the overall capacitance of a stacked module:

Overall capacitance of module=cell capacitance/# of cells in stack        (6)

In Equation 6,
# of cells in stack=# of electrodes in stack−1

Also, in FIG. 5b, the height of Z axis is a measure of the overall voltage of a stacked module. The higher the Z axis, the larger the module's working voltage will be. The overall working voltage of a module can be calculated by Equation (7):

Overall working voltage of module=# of cells in stack×cell voltage (3 V)        (7)

Assembly of electrodes by stacking is an in-house serial connection of multiple cells. Just like the in-house series linkage in lead-acid accumulators, there is no need of protection circuit for balancing the distribution of voltage among the linked cells. Since all cells are contained in same container (house), they share the same environment of vapor pressure and temperature leading to a self-equalization of voltage. Not only the protection circuit is saved, but also a lot of linkage materials is saved in the in-house series connection.

Management of Energy and Water Generated in AWFC System

Efficient operation and utilization of energy and sterilized water produced by the AWFC system requires a manager. The manager should maintain the reliable supply of clean water for energy generation via OER and ORR in the AWFC. Production of clean water is to meet more demands than just for OER, the liquid also fulfills all needs of fresh water. Online water purification relies upon the low power adsorptive desalination on MAC-C for TDS reduction, as well as on the low power AOP by $O_3$ and MAC-CX for COD (BOD included) eradication. This section focuses on large-scale of energy storage and high efficiency of energy utilization as well.

Power Tank

Figure 4:
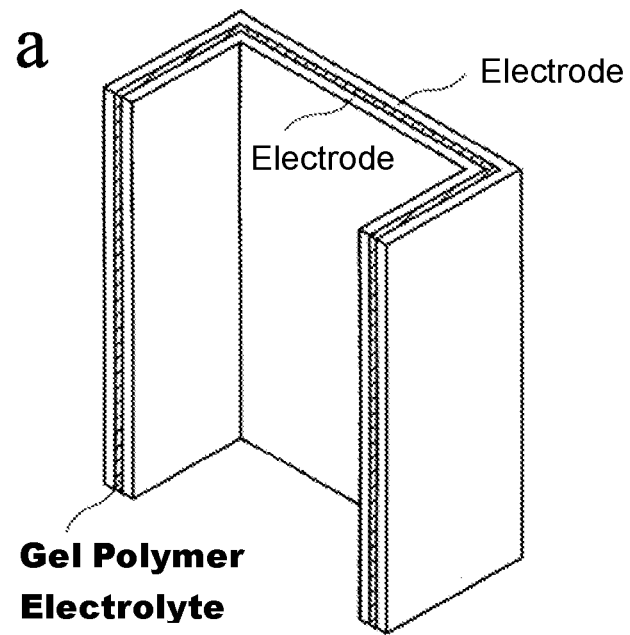
FIG. 4 is a side-view diagram of stacked supercapacitors made by 2 pieces of electrodes and GPE into half rectangle and cone supercapacitors, which can serve as shell, housing, chassis, frames, or interior supports for AWFC system. These invisible supercapacitors will store every bit of energy generated by ORR on cathodes.
Figure 4:
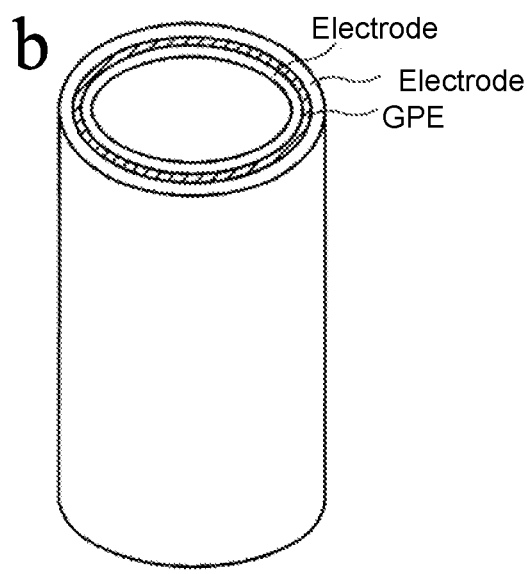
Figure 6:
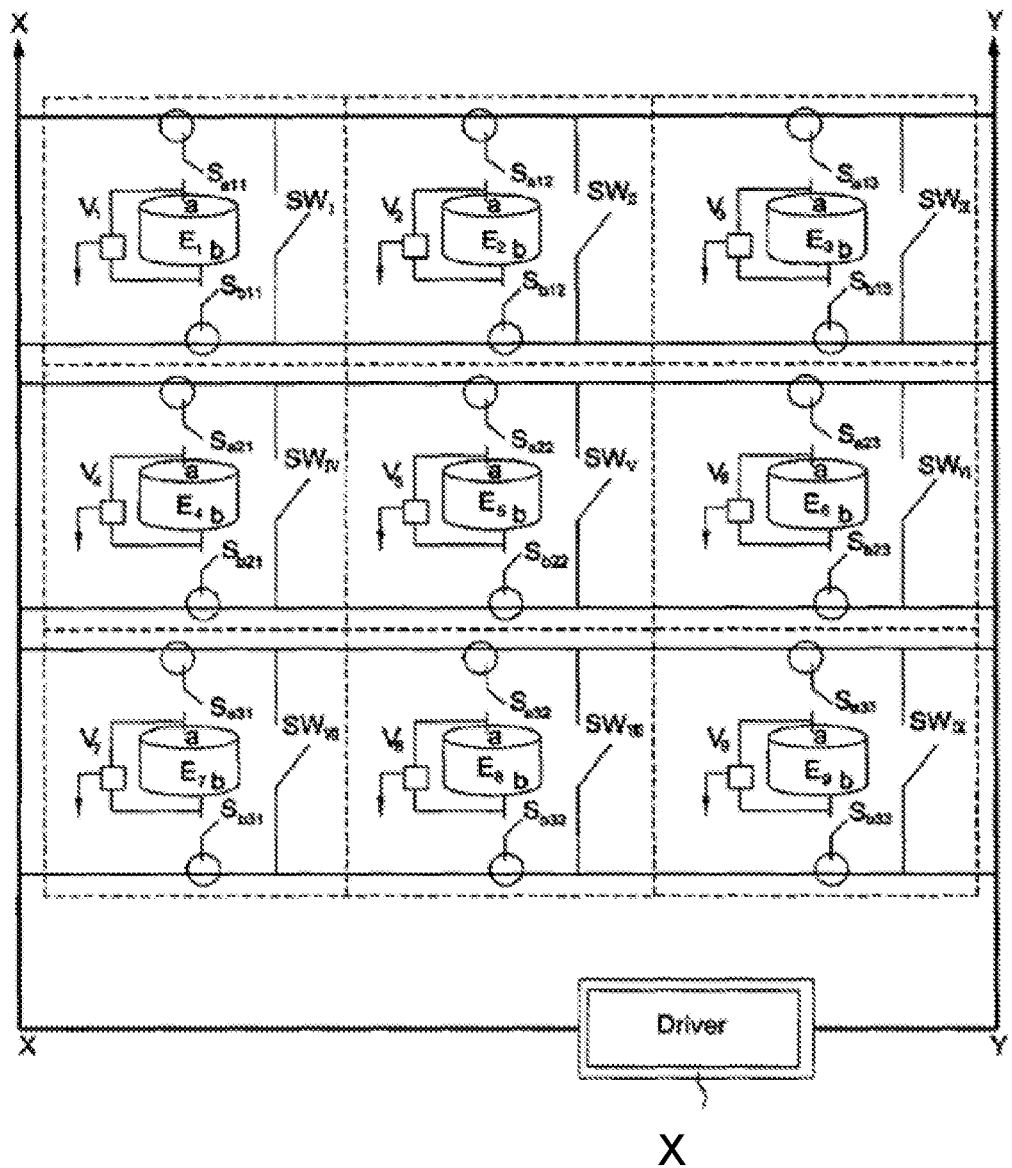
FIG. 6 is a diagram of built-in supercapacitors of AWFC system form a power tank, which is managed and driven by a central process unit (CPU).

FIG. 4 has shown that supercapacitor can be constructed in the forms of cube and column. Though other shapes of supercapacitors are undisclosed, the fabrication of electrodes by hydrothermal synthesis of FIG. 3 has no form factor limitation. Hence, supercapacitors can be built inside the AWFC system as casing to contain the system components, as chassis, and as interior supports. In-house serial connection of FIG. 5*a* permits the fabrication of the desired high-volt supercapacitor modules in various dimensions. Many supercapacitors can be built within the AWFC system. These energy-storage devices have no fixed physical connection, but they can be linked in real-time to form series, parallel or combination of the two. Such linkages can be executed via X-, Y-bus bars and electronic switches under the direction of a manager, central process unit (CPU) as revealed in FIG. 6. The drawing is taken from the U.S. Pat. No. 7,696,729, a patent granted to one of the inventors. The CPU will be equipped with the following functions:

"memorizing the supercapacitors' location; monitoring the energy state of the supercapacitors; identifying the failed supercapacitor; promptly charging the supercapacitors individually or collectively; calculating the # of supercapacitor needed for power delivery; serially linking the supercapacitors needed, regardless of their location, for power provision; calculating the # of supercapacitor needed for energy harvesting; parallel linkage of supercapacitors in need for energy harvesting; performing CD Swing; real-time reversing the polarity of supercapacitor; providing power for onboard water purification and delivering fresh water to AWFC; or for point of use."

Only by power tank and its CPU controller, every bit of energy generated by the AWFC can be completely saved. Moreover, the all power application demands can only be met via the massive storage capacity of power tank and its energy management system.

Charge-Discharge Swing (CD Swing) Platform

Conventional supercapacitors can be easily exhausted at discharging due to their low energy density. Power delivery by the supercapacitors is always intermittent for the devices need time to fully charged before they can release energy again. Further, the voltage of supercapacitor falls quickly at discharge and soon becomes ineffective as the voltage of supercapacitor is lower than the driving voltage of load. For saving energy, supercapacitor should be allowed to release only the energy stored under the first ⅓ part of its rated voltage. Using two identical groups of supercapacitors for power delivery, each group is allowed to release only the first ⅓ rated voltage. When the $1^{st}$ group has completed its set discharge, it will go into charging mode, and the $2^{nd}$ group will immediately assume the discharging role. In the next cycle, the charging and discharging sequence is exchanged. The two groups continuously perform the reciprocal charging and discharging until the demand of power is fulfilled. Since only the effective energy is released and refilled, the energy-utilization efficiency of CD swing is high. Moreover, the supercapacitors can deliver power continuously, which is not seen in conventional supercapacitors. The said CPU can dictate the operation of CD Swing, and it can also set the level of power delivered by controlling the switching frequency.

Reverse Charging Platform

In the discharge of supercapacitor modules made by in-house series link of FIG. 5*a*, it is observed that as one side of bipolar electrode is discharging, concurrently, the reverse side is being charged. The reverse charging is caused by the passage of return current from load via the supercapacitor back to the negative pole of power source. Eventually, the back side of the bipolar electrode will develop a higher value of voltage (−V) than the (+V) of the front side. On reversing the polarity of supercapacitor's leads by the said CPU, the exhausted supercapacitor will become active again. Reverse charging belongs to one kind of energy harvesting, which is similar to the regenerative braking of vehicles and machines with braking mechanism in terms of that they all have energy for retrieval. High energy utilization efficiency and energy harvest are equally important as energy generation. Similarly, $H_2O$ reservation and $H_2O$ reclamation are as important as $H_2O$ generation.

Figure 7:
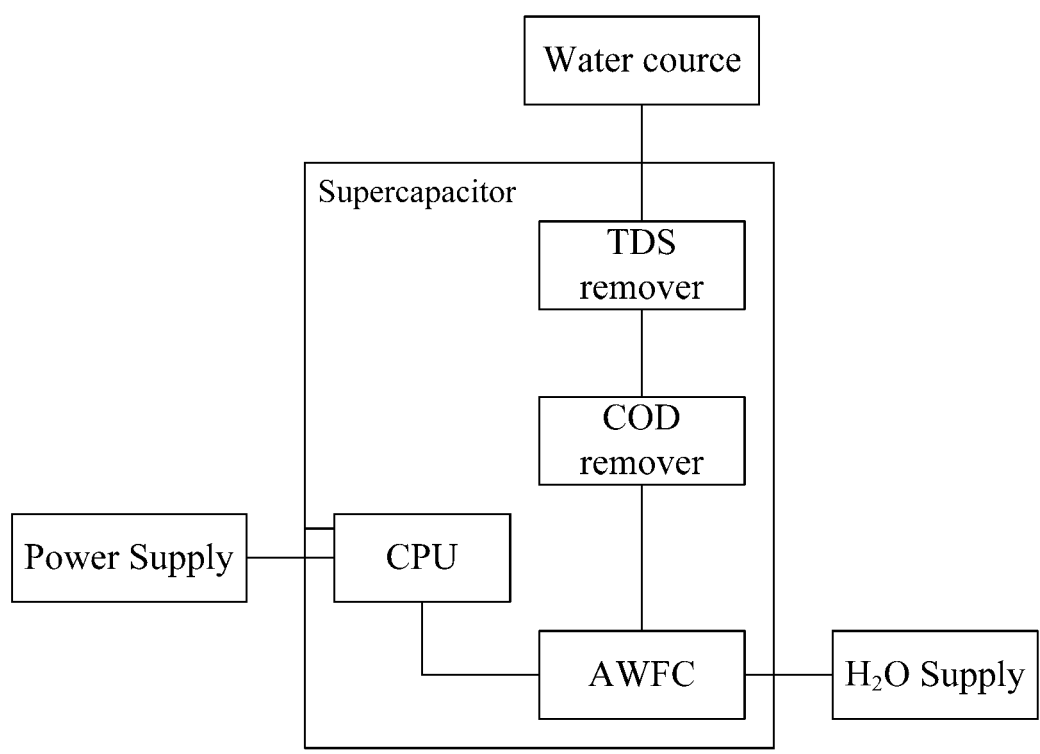
FIG. 7 is a diagram of an autocephalous AWFC system containing four subsystems: (1) AWFC, electricity and water generator, (2) online water purifier composed of TDS/COD removers, (3) Supercapacitors as housing, and (4) CPU manages the flow of electricity, O$_3$ gas) and H$_2$O.

Lastly, an autocephalous AWFC system is shown in FIG. 7. Onboard the system, there are supercapacitors and water reservoir (not shown) for actuating OER on Sb,Ni—$SnO_2$/Ti anode. Water can also be withdrawn by the onboard pump to get from a source of water such as river, lake, creek, ocean, ditch or underground. The intake water will be first treated by the low power adsorptive desalination under a weak electric and MAC-C to minimize the TDS of the intake. Then, the deionized water is flowed to the low power AOP for COD eradication by $O_3$ and MAC-CX.

If the treated water does not meet pre-set specifications, the CPU will direct water to be treated again and again. Finally, clean water will enter the AWFC to co-generate energy and sterilized water. Energy retrieval and injection of energy between the AWFC and CPU are two-way operations. As Sb,Ni—$SnO_2$/Ti anode is energized, $O_2$ will be generated and soon reduced by $Co_3O_4$—CNF/Ti cathode to $H_2O_2$ and electricity. OER and ORR have different kinetic rates, OER appears to be faster than ORR. That means $O_2$ evolved is more than $O_2$ consumed. Therefore, more cathode area should be provided for generating more electricity. Other electricity-increasing approaches include more reactive sites for reduction catalyst, more potent catalyst and efficient utilization of $O_2$ produced.

The first successful fuel cell was developed by Francis Bacon of British in 1932. He used $H_2$ and $O_2$ as fuels, an alkaline electrolyte, and Ni electrodes. In 1952, Bacon and a co-worker produced a 5-kW fuel cell system. In the late 1950's, NASA used alkaline, PEM and pure $H_2$ fuel cells in the Apollo, Gemini and Space Shuttle manned space vehicle programs. This invention uses only $O_2$ fuel from water via simple design and economical, efficient anode without PEM. In addition to safety due to $H_2$ free and benign $O_2$, the AWFC produces 1.2V per cell, which is significantly higher than 0.5V to 0.8V per cell of fuel cell based on $H_2$ and $O_2$ as fuels. Also, $O_2$ is directly converted to electricity in AWFC, whereas the alkaline fuel cells give $H_2$ as fuel only. Further, the design of AWFC is much simpler and less material consumption than the parts employed in $H_2$-based FC. It means that AWFC is more affordable and much easier to scale up to generate large current and high voltage for powering a community, a hospital, a factory, an electrical vehicle, an electrical bus and even a surveillance submarine.

Three examples on proving the feasibility of AWFC, as well as online water purification by low power adsorptive desalination by MAC-C on TDS reduction, and low power AOP by MAC-CX on COD eradication are cited below:

Example 1

A test sample of AWFC is formed by sandwiching a Sb,Ni—SnO2/Ti anode by 2 $Co_3O_4$—CNF/Ti cathodes at a fixed gap of 2 or 1 mm. The dimensions of both anode and cathode are 7.5 cm width×25 cm length. A tank of 15 liters of tap water is used for the test by submerging 20 cm length of the electrode set in tap water. For the sake of long-term test, a 10V DC power source is utilized to power OER on the anode. Also, a voltmeter in parallel with the electrode set for measuring the working voltage, wherein 9V is registered. As soon as bubbles are evolved on the anode, no bubble evolution was observed on the cathodes, an ammeter in series with cathodes, a resistor of 500Ω and anode shows a current of 20 to 25 mA. The presence of current reading on the ammeter with or without DC power supports electricity generation by ORR on cathodes. Table 4 lists several arrangements in the test and their outcomes.

TABLE 4

Power output of ORR under Different Conditions

| Air Cathode with holes | GAP (mm) | Power output of ORR (colt × mA) | | TDS drop (%) |
|---|---|---|---|---|
| | | OER power on | OER power off | |
| Yes | 2 | 9 × 20 (180 mW) | 2.4 × 10 (24 mW) | 30 |
| Yes | 1 | 9 × 20 (180 mW) | 2.4 × 10 (24 mW) | 40 |
| No | 1 | 9 × 25 (225 mW) | 2.4 × 15 (36 mW) | 50 |

In Table 4, OER on Sb,Ni—SnO$_2$/Ti anode is supported by a DC power supply set at 10V, and working current is shown as 3.5 A, which is affected by water evaporation (water level drops) and water temperature (water becomes warm). When the DC power is on, current generated by ORR is higher than that of power off. ORR also generates more current using air cathodes without perforated holes as $O_2$ is confined for ORR. With OER off, voltage generated by ORR is 2.4V, which is a combined voltage of 2 cells linked in series. It is a surprise to see that AWFC can soften the water therein. It is assumed that the cause of TDS reduction of $H_2O$ or water softening is peroxone, a combination of $O_3$ and $H_2O_2$. Due to the 2-cell AWFC sitting in static water for hours, the variation of water, such as, changes of temperature, TDS and pH, is detrimental to the current generation of ORR. Nevertheless, tin normal operation of the AWFC system of FIG. 7 is carried via water flowing-through the AWFC, the power generation by ORR will be stabilized.

Example 2

A pharmaceutical wastewater from a drug manufacturer of caffeine and antipyretic analgesics was treated by the $O_3$+MAC-CX of low power AOP. An $EO_3$ electrolyzer for producing $H_2/O_2/O_3$ is employed. The gaseous products are drawn into columns packed with MAC-CX particles or steel wool balls coated with MAC-CX. It was intended to evaluate the performance of the novel system on treating the wastewater in terms of ablation of COD, power spent per unit COD destructed, and transformation rate of $H_2$ to benign products. Table 5 lists the $O_3$+MAC-CX system employed, the condition of feed-in water, as well as the results of treatment:

TABLE 5

A pharmaceutical wastewater treated by $EO_3$ + MAC-CX

| System | | Before Treatment | After Treatment |
|---|---|---|---|
| $EO_3$ Module | Voltage | 10.45 V | |
| | Current | 18.1 A | |
| | Power | 189.15 | |
| MAC-CX | Column A | 500 g MAC-CX | |
| | Column B | 10 pieces of steel balls coated with MAC-CX | |
| Feed-in wastewater | | 10 L (liter) | |
| Water flow rate | | 70 mL/min (flow through Column A and B) | |
| Treatment Time | | 143 min | |
| COD (ppm) | | 74,803 | 63,295 |
| COD reduction | | 11,508 ppm | |
| COD removed weight | | 115,080 mg | |
| Power consumption | | 0.003913 Wh/mg COD (3.913 kWh/kg COD) | |
| $H_2$ @ exit of $EO_3$ | | 85.59 volume % | |
| $H_2$ @ system exhaust | | 1.82% (97.87% transformed) | |
| $O_3$ @ exit of $EO_3$ | | 18,295 ppm (18.295 g/L) | |
| $O_3$ @ system exhaust | | 0 ppm | |

As shown in Table 5, while ozone generated in treatment time of 2.38 hours is completely consumed, the transformation rate of $H_2$ is about 98%, which is higher than that of hydrogen reactors employed at petroleum refinery factories. The wastewater also contained TDS was measured as high as 90.1 mS/cm (equivalent to ca. 180,200 ppm, 3-time higher than that of average seawater). The high level of TDS was left alone, and it appeared immaterial to the eradication of COD. One reason for the non-influence of TDS is that it has no effect on the catalytic function of MAC-CX. The catalyst X in Table 5 is chosen for transforming $H_2$ rather than tor COD eradication. Table 5 shows that the eradication of 1 kg COD by low power AOP only consumes about 4 kWh of power and 183 g $O_3$ together with $H_2$ 'byproduct'.

Example 3

A major drug company manufactures a number of antibiotics, painkillers, stomach acid inhibitor, and blood pressure regulators. These pharmaceuticals are polynuclear hydrocarbons (PHCs), and they are pharmaceuticals and personal care products (PPCPs). When PPCPs enter various water bodies, they may modulate endocrine system pathways in vertebrate species, hence, they are called endocrine disrupting contaminants (EDCs). EDCs are regarded as refractory pollutants that are hardly degraded by traditional techniques. A batch of wastewater was provided by the said company, wherein the COD content is as high as 209,617 ppm. Such high-COD-loaded water can't be treated by the prevailing techniques on the water treatment market without dilution by several factors using $H_2O$. But, adding water to the raw wastewater will increase the total volume of $H_2O$ to be treated exponentially. $O_3$+MAC-CX system is called for treating the extra-high-COD wastewater. Table 6 lists the components with a set of parameters in pre-treatment apparatus, such as, EC (electrocoagulation), $EO_3$ (electrolytic ozone), and $EO_3$+MAC-CX system, the COD measurement at each stage of treatment is provided as well.

TABLE 6

Extra-High-COD wastewater treated by $EO_3$ + MAC-CX system

| System | # | Operation settings | Treating Time | pH | TDS (mS/cm) | COD (ppm) |
|---|---|---|---|---|---|---|
| | | 5 L raw wastewater | | 4.1 | 88.3 | 209,617 |
| | | Adjust pH of raw wastewater by a base | | 9.2 | 90.3 | 194,821 |
| EC | 1 | Fe anode* | 65 mL/min | 8.8 | 89.5 | 194,821 |
| | 2 | Fe anode** | | 9.0 | 89.6 | 194,821 |
| | 3 | Al anode | | 9.2 | 89.1 | 203,041 |
| $EO_3$ module | | 9.74 V (constant voltage) 20 A | | | | N/A |
| MAC-CX X: 4 metal Oxides | A | No electricity | 30 Min together | 7.9 | 91.7 | 129,061 |
| | B | 3.89 V × 0.64 A | | 7.0 | 91 | 64,530 |
| | C | 5.5 V × 0.44 A | | 6.4 | 79.5 | 35,019 |

*Applied 120 V, current 0.6 A
**Applied 109 V for EC2 and EC3 in series, current 1.8 A Table 6 indicates that the large reduction of COD occurred by the low power AOP degradation of COD by $O_3$+MAC-CX. Each flow-bed column of A, B and C is filled with 500 g of MAC-CX granules, wherein B and C are also applied a weak DC electrical field for conducting micro electrolysis thereon. Gradually, COD of the raw wastewater is reduced from 209,617 ppm to 35,019 ppm, a removal rate of 83.3% via flow-through. Had $H_2$ being transformed to . OH by MAC-CX incorporated in Table 6, the COD reduction might be improved to 100% eradication. Although, pH adjustment of raw wastewater by adding an alkaline has significantly removed COD by 14,796 ppm, the following serial pretreatment by three consecutive electrocoagulation (EC) units appeared ineffective on COD ablation. Perhaps, the EC operation may only serve to protect the MAC-CX adsorbents.

A weak DC field and MAC-CX appear to have synergistic effect through the conductive nano carbon film, C, deposited on MAC. C imparts electrical conductivity to MAC so that the adsorption and desorption the surface of GAC granules are modulated by the electrical field. In addition to low power of the adsorptive oxidation of MAC-CX, there is no sludge formed in the treatment by MAC-CX. Thus, the $EO_3$+MAC-CX system is energy effective, as well as cost effective. In U.S. Pat. No. 9,174,895 granted to one of the inventor, L R Shiue, of the invention, $EO_3$ is combined with EC using iron (Fe) as anode to generate Fe(VI) ion in the forms of $FeO_4^{2-}$ or $[Fe(IV)O]^{2+}$ for fast kill of COD species. '895 discloses a technique that not only consumes much more power than the $EO_3$+MAC-CX system, it also generates sludge that requires costly post treatment. Sludge is also a cost factor in prevailing treatment techniques of COD pollution on the market, such as, electric Fenton reaction.

Oxygen is known as a combustion promoter, but it is not flammable. Nobody has developed a fuel cell using $O_2$ as fuel. However, this patent has proved that $O_2$ can be produced via water electrolysis on Sb,Ni—$SnO_2$/Ti anode, followed by reduction of $O_2$ on $Co_3O_4$—CNF/Ti cathode. The catalytic reduction of $O_2$ will produce $H_2O_2$ and electricity. Both products of cathodic reduction have their merits. While $H_2O_2$ has been widely utilized in water treatment, the followings review benefits presented by this invention, and the best use of electricity generated.

1. Disinfectants: Elimination of microbes and decomposition of insecticides is achieved by controlled online generation of ozone ($O_3$) and hydrogen peroxide ($H_2O_2$) in the right dose at the right time without $H_2$ evolution.

2. Water Purification: The refractory water-bone pollutants are indicated by high TDS and high COD. The former can be significantly reduced by MAC-C, while the latter is totally eradicated by the combination of $O_3$ and MAC-CX. Both MAC-C & MAC-CX can be quickly regenerated.

3. Supercapacitors: Using carbon nanofilm (CNF) directly grown on SS in conjunction with GPE, high-volt supercapacitor modules can be fabricated to store electricity produced by ORR and to convert the energy to high-power outputs.

4. Energy Utilization: Multiple supercapacitor (S/C) modules are formed a power tank to expand the storing capacity of S/C. Using CD Swing and reverse charging, the stored energy is efficiently utilized in an effective and efficient way.

If the key technology of this invention has to be named, the answer is hydrothermal synthesis of FIG. 3. After synthesis, the selected precursor and its additives including catalyst are converted into doped CNF bonded to substrates, such as, SS, Ti, ceramics, or honey combs, which become instant electrodes or instant adsorbents ready to perform. Though ion plasma spray coating may produce the said electrodes as well, it has less freedom in material selection and target preparation.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of generating electricity using oxygen from water, comprising the following steps of:
   preparing a basic unit without membrane by a Sb,Ni—$SnO_2$/Ti anode sandwiched by two $Co_3O_4$—CNF/Ti cathodes at a fixed gap, wherein the CNF is carbon nanofilm;
   providing an online purification of water by total dissolved solid reducing (TDS-reducing) adsorbents and chemical oxygen demands ablating (COD-ablating) adsorbents, wherein the water is in fluid form and is one selected from of the group consisting of tap water, fresh water, online purified water and water vapor;
   attaining oxygen by electrolysis water on the Sb,Ni—$SnO_2$/Ti anode via oxygen evolution reaction (OER) and generating electricity by reduction of oxygen on the $Co_3O_4$—CNF/Ti cathodes via oxygen reduction reaction (ORR) using a low DC power; and
   withdrawing and storing the electricity generated by the cathodes by at least one supercapacitor.

2. The method of claim 1, wherein the basic unit contains two cells in series connection.

3. The method of claim 1, wherein the OER and ORR are processed in the water, the OER produces oxygen and ozone gas, and the ORR produces hydrogen peroxide and electricity.

4. The method of claim 1, wherein the anode has a catalyst comprising Sb and Ni doped $SnO_2$ deposited on Ti expressed as Sb,Ni—$SnO_2$/Ti, the precursors for the three metals are $SnC_2O_4$, $Sb_2O_3$ and $Ni(CH_3COO)_2$ respectively, the concentration of each metal ion in an aqueous coating solution is in ranges of: $[Sn^{4+}]=0.8$~$1.2$ M, $[Sb^{3+}]=2.8$~$4.4\%$ of $[Sn^{4+}]$, and $[Ni^{2+}]=0.8$~$1.8\%$ of $[Sn^{4+}]$.

5. The method of claim 1, wherein the CNF is made by hydrothermal synthesis using a precursor selected from polyacrylonitrile (PAN), polyvinyl pyrrolidone (PVP), polyvinyl alcohol (PVA), polyacrylic acid (PAA), polymethyl methacrylate (PMMA), celluloses, dextrin, lignin, ligno salt, polysaccharides, gelatin and polyimide.

6. The method of claim 5, wherein the hydrothermal synthesis contains two stages of thermal treatment including charcoalization under 200-400° C. and air, as well as carbonization under 600-900° C. without oxygen.

7. The method of claim 1, wherein the $Co_3O_4$ on the cathode is made from a cobalt salt selected from cobalt nitrate, cobalt sulfate, cobalt carbonate, cobalt hydroxide, cobalt bromide and cobalt chloride.

8. The method of claim 1, wherein the supercapacitor is constructed by assembly via juxtaposition stacking of a plural number of electrodes.

9. The method of claim 1, wherein the COD-ablating adsorbents are represented by MAC-CX, the MAC is modified active carbon, and X is the catalyst of metal oxides using precursors selected from the first row of transition metals of the periodic table, including, Sc, Ti, V, Cr, Mn, Fe, Co, Cu and Zn.

10. The method of claim 1, wherein the supercapacitors are in a plural number for serving as chassis, frame and supports for a electricity-generating system.

11. The method of claim 10, wherein the multiple supercapacitors are directed by a central process unit (CPU) to perform charging-discharging swing (CD Swing) for the best use of electricity generated by the ORR.

12. The method of claim 1, wherein the low DC power includes 3-10 volts and 3-10 amperes using pulse width modulation (PWM).

* * * * *